(12) United States Patent
Koganezawa

(10) Patent No.: US 7,188,988 B2
(45) Date of Patent: Mar. 13, 2007

(54) LIQUID CRYSTAL DISPLAY DEVICE, DISPLAY DEVICE AND BACKLIGHT DEVICE

(75) Inventor: Nobuyuki Koganezawa, Chiba (JP)

(73) Assignees: Hitachi Displays, Ltd., Chiba-ken (JP); Hitachi Display Devices, Ltd., Chiba-ken (JP)

( * ) Notice: Subject to any disclaimer, the term of this patent is extended or adjusted under 35 U.S.C. 154(b) by 90 days.

(21) Appl. No.: 11/108,838

(22) Filed: Apr. 19, 2005

(65) Prior Publication Data

US 2005/0243243 A1    Nov. 3, 2005

(30) Foreign Application Priority Data

Apr. 23, 2004    (JP)    .............. 2004-127662

(51) Int. Cl.
*F21V 8/00*    (2006.01)

(52) U.S. Cl. ...................... 362/616; 362/561

(58) Field of Classification Search ............... 362/31, 362/602, 612, 616, 561
See application file for complete search history.

(56) References Cited

U.S. PATENT DOCUMENTS 5,808,708 A * 9/1998 Oyama et al. .............. 349/65
6,065,846 A * 5/2000 Kato et al. ................. 362/30

* cited by examiner

*Primary Examiner*—Laura K. Tso
(74) *Attorney, Agent, or Firm*—Reed Smith LLP; Stanley P. Fisher, Esq.; Juan Carlos A. Marquez, Esq.

(57) ABSTRACT

The present invention provides a display device comprising a display panel and a backlight device comprising a main light guide body which irradiates light toward the display panel. A sub light guide body is arranged on the back surface of the main light guide body is divided in the center by a first air layer. Both end portions of the sub light guide are optically coupled to the main light guide, and a plurality of solid state light emitting elements are arranged in the inside of the air layer of the sub light guide.

20 Claims, 8 Drawing Sheets

LIQUID CRYSTAL DISPLAY DEVICE, DISPLAY DEVICE AND BACKLIGHT DEVICE

CROSS-REFERENCE TO RELATED APPLICATIONS

The disclosure of Japanese Patent Application No. 2004-127662 filed on Apr. 23, 2004 including the specification, drawings and abstract is incorporated herein by reference in its entirety.

BACKGROUND OF THE INVENTION

The present invention relates to a liquid crystal display device, a display device, and a backlight device, and more particularly to a solid-state-light-emitting-element (LED) direct backlight device which is mounted on a back surface side of a display device and irradiates a light-source light to the display device and the display device which uses the backlight device.

Recently, as a backlight used in a large-sized liquid crystal television set, a large-sized monitor or the like, a cold cathode fluorescent lamp has been mainly popularly used. The backlight device which uses the cold cathode fluorescent lamp is roughly classified into a side-edge type backlight device which arranges a cold cathode fluorescent lamp on a side of a light guide body and a direct backlight device which arranges a plurality of cold cathode fluorescent lamps in parallel on a back surface of a liquid crystal display panel without arranging a light guide body.

While having an advantage that the side-edge type backlight device can have the relatively compact shape, the side-edge type backlight device has a drawback that the light utilizing efficiency is low. On the other hand, while having the high light utilizing efficiency, the direct backlight device increases a thickness thereof. To replace the backlight device which uses such a cold cathode fluorescent lamp as a light source, recently, a backlight device which uses a solid-state light emitting element (LED) represented by a light emitting diode which exhibits the high color reproducibility and the rapid responsive speed and uses no mercury to satisfy the demand for the preservation of environment as a light source has been studied and developed by concerned companies.

Recently, as a solid-state light emitting element, a solid-state light emitting element which is capable of emitting three colors consisting of R (red), G (green), B (blue) and a solid-state light emitting element capable of emitting white color have been developed. With respect to the solid-state light emitting element which is used as a light source of a backlight device, since it is desirable to irradiate a white light to a display panel eventually, the use of the solid-state light emitting element capable of emitting the white color light is considered. However, the white solid-state light emitting element which irradiates the white light obtains the white light by converting the color emitted from the blue-light solid-state light emitting element or the ultraviolet-light solid-state light emitting element into the white color using phosphors and hence, there arises a drawback that the white color solid-state light emitting element exhibits the poor color rendering and narrows a range of color reproducibility.

On the other hand, the solid-state light emitting elements capable of emitting lights of three colors consisting of R (red), G (green), B (blue) is superior to the white solid-state light emitting element with respect to a point that three-color-light-emitting solid-state light emitting element can obtain the wide range of color reproducibility and a point that by changing a current quantity of the solid-state light emitting elements capable of emitting lights of three colors consisting of R (red), G (green), B (blue), chromaticity of the backlight can be freely changed. From this viewpoint, it is preferable to use the solid-state light emitting elements capable of emitting lights of three colors consisting of R (red), G (green), B (blue) at this stage.

With respect to the constitution of the backlight device which uses the solid-state light emitting elements capable of emitting lights of three colors consisting of R (red), G (green), B (blue) as a light source, the solid-state light emitting elements capable of emitting lights of three colors consisting of R (red), G (green), B (blue) may be arranged on a back surface of the display panel and this constitution is shown in FIG. 19 which is a developed perspective view of an essential part. As shown in FIG. 19, on a back surface of the liquid crystal display panel which, for example, constitutes the display panel, a solid-state light emitting element array ALL which mounts the solid-state light emitting elements LED capable of emitting three colors consisting of R (red), G (green), B (blue) thereon is arranged, a reflector REF10 is arranged on a back surface of the solid-state light emitting element array ALL, and side reflectors REF11, REF12, REF13, REF14 are arranged on side-surface-side.

Further, an optical sheet stacked body OPS is arranged above the solid-state light emitting element array ALL by way of an air layer ARL, wherein the optical sheet stacked body OPS is formed by stacking a first diffusion sheet DF1, a first prism sheet PRZ1, a second prism sheet PRZ2 and a second diffusion sheet DF2 in this order from the solid-state light emitting element array ALL side. Further, between this optical sheet stacked body OPS and the solid-state light emitting element array ALL which mounts the solid-state light emitting elements LED capable of emitting lights of three colors consisting of R (red), G (green), B (blue) thereon, an air layer ARL which has a relatively large layer thickness is arranged.

In the backlight device having such a constitution, the light which is emitted from the solid-state light emitting elements LED capable of emitting lights of three colors consisting of R (red), G (green), B (blue) which constitutes the light source is subjected to the color mixture using the air layer ARL, the reflector REF10 and the side reflectors REF11 to REF14 and, thereafter, the light is irradiated to, for example, the back surface of the liquid crystal display panel which constitutes the display panel.

The constitution which uses the solid state light-emitting element as a light source of the backlight device is disclosed in a following literature 1. Further, the constitution which irradiates the white light to the liquid crystal display panel by performing the color mixture using the solid-state light emitting elements capable of emitting lights of three colors consisting of R (red), G (green), B (blue) as the light source is disclosed in a following literature 2. Still further, the constitution which arranges a light guide for color mixture on a back surface side of a light guide body is disclosed in a following literature 3.

That is, the display device which uses light emitting diodes which constitutes the light emitting elements in the light guide body as the light source is disclosed in, for example, Japanese Patent Laid-Open 109421/2003 (literature 1), SID 02 DIGEST "40.5L: Late-News Paper: 18. 1-inch XGA TFT-LCD with Wide Color Reproduction using High Power LED-Backlighting (literature 2), and S-12.

"LCDbacklight light source with high color reproducibility", the 36th Nation-wide Convention, Japan Illumination Association, Heisei 15(2003) (literature 3).

BRIEF SUMMARY OF THE INVENTION

However, in the backlight device having such a constitution, to perform the favorable color mixture, it is necessary to increase a thickness of the air layer ARL formed between the solid-state light emitting elements LED capable of emitting lights of three colors consisting of R (red), G (green), B (blue) which constitutes the light source and the optical sheet stacked body OPS. That is, it is necessary to form a gap having the large thickness and hence, a thickness of the backlight portion is formed largely correspondingly thus giving rise to a drawback that a shape or the like of the backlight portion becomes also large.

Accordingly, the invention has been made to overcome the above-mentioned drawbacks of the related art and it is an object of the invention to provide a backlight device which uses solid-state light emitting elements capable of emitting lights of three colors consisting of R (red), G (green), B (blue) as a light source, wherein by providing the thin backlight-portion constitution, the backlight device can perform the favorable color mixture and hence, the light utilizing efficiency can be enhanced whereby the light-source light having the excellent brightness uniformity and chromaticity uniformity can be obtained and, at the same time, the backlight device can be made light-weighted.

It is another object of the invention to provide a display device having a solid-state light emitting element direct backlight device which can obtain display images with high brightness which exhibits the high color reproducibility and a high response speed using a backlight device capable of obtaining a light-source light which exhibits the high brightness uniformity and the high chromaticity uniformity.

According to a first aspect of the invention, the backlight device according to the invention includes a main light guide body which has a light irradiation surface which irradiates light forwardly by developing the light in plane and has a light reflection surface which faces the light irradiation surface in an opposed manner and reflects the light toward the light irradiation surface, a sub light guide body which is arranged on a back surface of the main light guide body, is divided into a first sub light guide body and a second sub light guide body on both end sides by way of a first air layer disposed at a center portion, and forms light incident surfaces on facing end surfaces of the first sub light guide body and the second sub light guide body in the inside of the first air layer, a first light reflection plate which is arranged on a front surface of the sub light guide body which faces the main light guide body, a second light reflection plate which is arranged on a back surface of the sub light guide body which faces the first light reflection plate in an opposed manner, reflectors which are arranged on both end surfaces of the main light guide body and the sub light guide body and optically couple the main light guide body and the sub light guide body, and a solid-state light emitting element board which is mounted in a state that the solid-state light emitting element board faces a back surface of the sub light guide body and solid-state light emitting elements capable of emitting light of plurality of colors in the inside of the first air layer are arranged at least in a row. Due to such a constitution, the backlight device can obtain the high brightness and a long optical path length and hence, a thin backlight portion can be formed whereby the drawbacks of the related art can be overcome.

Further, according to the backlight device of the invention, in the above-mentioned constitution, the solid-state light emitting element is preferably constituted of a side-emitter-type solid-state light emitting element and hence, the backlight device can obtain the high brightness and the long optical path length whereby the drawbacks of the related art can be overcome.

Further, according to the backlight device of the invention, in the above-mentioned constitution, the solid-state light emitting element board is preferably mounted on front and back surfaces of the first air layer by arranging the solid-state light emitting elements capable of emitting the light of plurality of colors in an opposed manner in the first air layer and hence, the backlight device can obtain the high brightness and the long optical path length whereby the drawbacks of the related art can be overcome.

Further, according to the backlight device of the invention, in the above-mentioned constitution, the first sub light guide body and the second sub light guide body are preferably formed by filling a light transmitting liquid in the inside of a light transmitting container and hence, a weight of the sub light guide bodies can be reduced whereby the drawbacks of the related art can be overcome.

Further, according to the backlight device of the invention, in the above-mentioned constitution, a second air layer having at least one-layer constitution is preferably provided in the inside of respective first sub light guide body and second sub light guide body and hence, the weight of the sub light guide bodies can be reduced whereby the drawbacks of the related art can be overcome.

Further, according to the backlight device of the invention, in the above-mentioned constitution, light incident surfaces of the first sub light guide body and the second light guide body are preferably provided with an incident angle which allows the light irradiated from the solid-state light emitting element capable of emitting light of a plurality of colors to be incident on the optical incident surfaces and hence, it is possible to enhance the light utilizing efficiency of the light irradiated from the solid-state light emitting element capable of emitting light of plurality of colors whereby the drawbacks of the related art can be overcome.

According to the backlight device of the invention, it is possible to ensure the long effective optical path length by reducing the thickness of the direct backlight portion of the solid-state light emitting element and hence, it is possible to obtain the light-source light having the high brightness uniformity and the high chromaticity uniformity whereby the brightness/power consumption ratio can be enhanced thus giving rise to extremely excellent advantageous effects such as the reduction of the number and the quantity of solid-state light emitting elements and the optical parts.

Further, according to the backlight device of the invention, by using a light transmitting liquid as a material of the sub light guide body, it is possible to reduce the weight of the backlight portion. Further, by dividing the sub light guide body into a plurality of sub light guide bodies with at least one layer of air layer therebetween, the weight of the backlight portion can be further reduced and, at the same time, the optical path length can be elongated. Further, with the use of the side emitter type solid-state light emitting element, it is possible to obtain extremely excellent advantageous effects such as the further enhancement of the light utilizing efficiency, the high brightness and the like.

Further, according to the backlight device of the invention, it is possible to acquire extremely excellent advantageous effects including the realization of the solid-state light-emitting-element direct backlight for a large-sized display device which can, compared to the cold cathode fluorescent lamp which uses mercury, obtain a light-source light which exhibits the substantially equal or higher brightness uniformity and the substantially equal or higher chromaticity uniformity and uses no mercury to satisfy the demand for the preservation of environment.

According to another aspect of the invention, in a liquid crystal display device which includes a liquid crystal display panel which is constituted by sandwiching a liquid crystal layer between a pair of transparent substrates having electrodes for forming pixels on inner surfaces thereof and a backlight device which is mounted on a back surface of the liquid crystal display panel, the backlight device includes a main light guide body which has a light irradiation surface which irradiates light forwardly by developing the light in plane, a sub light guide body which is arranged on a back surface of the main light guide body, is divided into a first sub light guide body and a second sub light guide body on both end sides by way of a first air layer disposed in the vicinity of a center portion, and forms light incident surfaces on facing end surfaces of the first sub light guide body and the second sub light guide body in the inside of the first air layer, reflectors which are arranged on both end surfaces of the main light guide body and the sub light guide body and optically couple the main light guide body and the sub light guide body, and a solid-state light emitting element board which is mounted in a state that solid-state light emitting elements capable of emitting light of respective colors consisting of R, G, B in the inside of the first air layer of the sub light guide body are arranged at least in a row.

The solid-state light emitting element is preferably a side-emitter-type solid-state light emitting element.

Further, the backlight device may be configured such that the main light guide body has a light reflection surface which faces the light irradiation surface in an opposed manner and reflects the light toward the light irradiation surface, and the sub light guide body includes a first light reflection surface on a surface thereof which faces the main light guide body and a second light reflection surface on a back surface which faces the first light reflection surface in an opposed manner.

Further, the solid-state light emitting element board may be mounted on front and back surfaces of the first air layer by arranging the solid-state light emitting elements capable of emitting light of plurality of colors in the inside of the first air layer in a state that the solid-state light emitting elements face each other.

Further, the first sub light guide body and the second sub light guide body may be constituted by filling a light transmitting liquid in the inside of a light transmitting container.

Further, the inside of the first sub light guide body and the second sublight guide body may be divided into a plurality of sub light guide bodies by interposing a second air layer consisting of at least one layer.

Further, light incident surfaces of the first sub light guide body and the second sub light guide body may be provided with an incident angle which allows the light irradiated from the solid-state light emitting element capable of emitting light of a plurality of colors to be incident on the light incident surfaces.

According to still another aspect of the invention, the invention is directed to a display device which includes a display panel which performs an image display and a backlight device which is arranged on a back surface of the display panel, wherein the backlight device includes a main light guide body which has a light irradiation surface for irradiating light toward the display panel side, a sub light guide body which is arranged on a back surface of the main light guide body, has the vicinity of a center thereof divided by a first air layer, and has both end portions thereof respectively optically coupled to the main light guide body, and a plurality of solid-state light emitting elements which are arranged in the inside of the first air layer of the sub light guide body.

The solid-state light emitting element is preferably a side-emitter-type solid-state light emitting element.

Further, the main light guide body and the sub light guide body may be configured to be optically coupled to each other using a reflector.

Further, the sub light guide body may be configured to be divided into a plurality of sub light guide bodies due to a second air layer different from the center portion.

A light incident surface of the sub light guide body with respect to the solid-state light emitting elements may be configured to be inclined by approximately 10° with respect to the vertical direction.

Further, the plurality of solid-state light emitting elements may be configured to be arranged at least in a row.

Further, the plurality of solid-state light emitting elements may be configured to be arranged above and below the first air layer and to face each other.

Further, the main light guide body may be configured to include a light reflection surface on a surface opposite to the light irradiation surface.

Further, the sub light guide body may be configured to have a reflection surface on upper and lower surfaces of the sub light guide body.

The invention can, due to such constitutions, enhance the uniformity of the brightness and the uniformity of the chromaticity and hence, the invention can obtain the high-quality image display whereby it is possible to overcome the drawbacks of the related art.

The invention is not limited to the above-mentioned constitutions and various modifications can be made without departing from the technical concept of the invention.

Further, according to the display device of the invention, it is possible to obtain the light-source light with the high brightness uniformity and the high chromaticity uniformity from the back-surface direct backlight device which constitutes the solid-state light emitting elements and hence, the display device can obtain the excellent advantageous effects such as the display image of high brightness with the high color reproducibility and the rapid responsiveness.

DETAILED DESCRIPTION OF THE INVENTION

Hereinafter, embodiments of a liquid crystal display device according to the invention are explained in conjunction with attached drawings which show respective embodiments.

Embodiment 1

Figure 1:
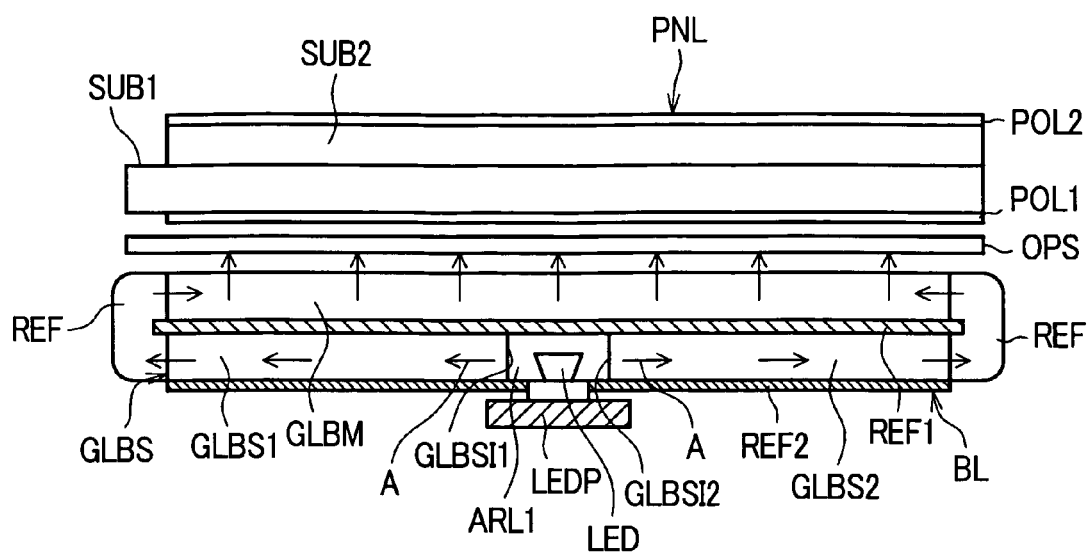
FIG. 1 is a cross-sectional view of an essential part showing the structure according to an embodiment 1 of a liquid crystal display device having a solid-state light emitting element direct back light device as a display device of the invention.

FIG. 1 is a cross-sectional view of an essential part for explaining the constitution according to an embodiment 1 of a backlight device of the invention and a liquid crystal display device which constitutes a display device having the backlight device. In FIG. 1, reference symbol PNL indicates a liquid crystal display panel which constitutes a display panel. The liquid crystal display panel PNL sandwiches a liquid crystal layer between a first substrate SUB1 and a second substrate SUB2. The liquid crystal display panel PNL also includes electrodes, active elements or the like for forming pixels on an inner surface or inner surfaces of either one or both of glass-made first substrate SUB1 and/or second substrate SUB2. Here, the first substrate SUB1 on which the active elements such as thin film transistors (TFT) are formed is also referred to as an active matrix substrate and the first substrate SUB1 which uses the thin film transistors is also referred to as a TFT substrate.

Further, a first polarizer POL1 is stacked on a first main surface (backlight device side) by lamination or the like, while a second polarizer POL2 is stacked on a second main surface (display screen side) by lamination or the like. Further, on a back surface side of the liquid crystal display panel PNL, an optical sheet stacked body OPS is mounted. The optical sheet stacked body OPS is configured by stacking a first diffusion sheet, a first prism sheet, a second prism sheet and a second diffusion sheet in this order by lamination or the like from a side which faces a main light guide plate of the backlight device which will be explained later.

Further, on a back surface side of the optical sheet stacked body OPS, the backlight device BL according to the invention is mounted. In this backlight device BL, the main light guide plate GLBM includes a light irradiation surface which irradiates light toward the optical sheet stacked body OPS by developing the light in plane on the optical sheet stacked body OPS side and a light reflection surface which reflects the light toward the light irradiation surface on a surface opposite to the light irradiation surface. A first air layer ARL1 which forms a light introduction opening is formed in an approximately center portion of the back surface side of the main light guide plate GLBM along the longitudinal direction. Using the first air layer ARL1 as the center, on both sides of the first air layer ARL1, a first sub light guide body GLBS1 and a second sub light guide body GLBS2 which are formed by dividing a sub light guide plate GLBS in two are mounted.

Further, on front and back surfaces of the sub light guide plate GLBS, a light reflection plate REF1 and a light reflection plate REF2 are mounted by lamination or the like. Here, these main light guide plate GLBM and the sub light guide plate GLBS (the sub light guide plate GLBS1 and the sub light guide plate GLBS2) are formed of a transparent acrylic resin plate material or the like. Further, on facing ends of the first sub light guide body GLBS1 and the second sub light guide body GLBS2 which are mounted on both sides by way of the first air layer ARL1, a light incident surface GLBS11 and a light incident surface GLBS12 which constitute light introducing openings which respectively allow the light to be introduced into the inside of the first sub light guide plate GLBS1 and the second sub light guide plate GLBS2 are formed.

Figure 2:
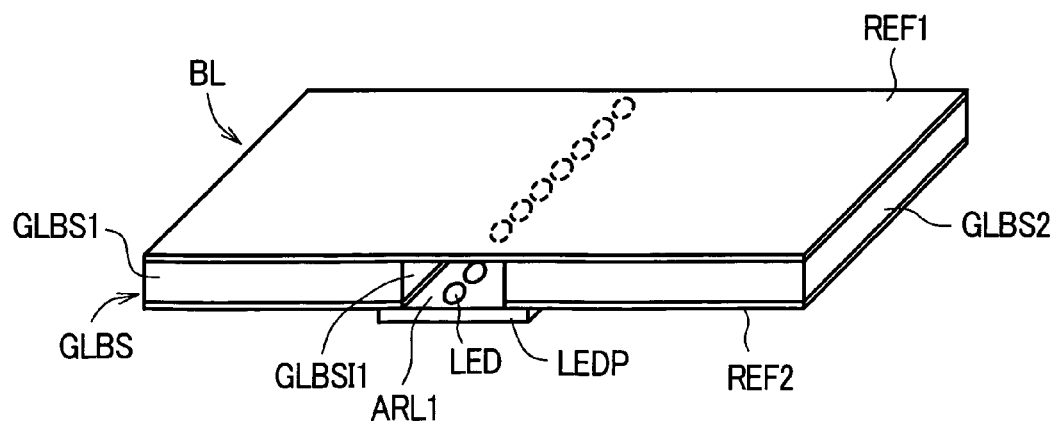
FIG. 2 is a perspective view of an essential part showing the constitution of the backlight device shown in FIG. 1.

Further, on both end surfaces of four sides of the main light guide plate GLBM and the sub light guide plate GLBS which are stacked, light reflection plates REF having a U-shaped cross section which optically couple the main light guide plate GLBM and the sub light guide plate GLBS are mounted by lamination or the like. Further, on a back surface of the sub light guide plate GLBS, as shown in FIG. 2 which is a perspective view of an essential part, a light emitting diode board LEDP is configured such that in the inside of the first air layer ARL1, side-emitter-type solid-state light emitting elements (hereinafter referred to as light emitting diodes) LED capable of emitting lights of three colors consisting of R (red), G (green), B (blue) are mounted in a state that the light emitting diodes LED are arranged in a row. Here, the light emitting diodes LED capable of emitting lights of three colors are arranged in order of, for example, R (red), G (green), G (green), B (blue) and are mounted in a state that these light emitting diodes LED are completely accommodated in the inside of the first air layer ARL.

In the backlight device BL having such a constitution, as shown in FIG. 1, the lights irradiated from the light emitting diodes LED capable of emitting lights of three colors are incident on the inside of the first sub light guide body GLBS1 and the second sub light guide body GLBS2 respectively in the direction indicated by an arrow A through both of the light incident surface GLBS11 and the light incident surface GLBS12 formed in the inside of the first air layer ARL1 and propagate in the inside of the sub light guide plate GLBS while being subjected to color mixture due to the reflection and the diffusion thereof by the light reflection plates REF1, REF2 formed on the front and back surfaces of the sub light guide plate GLBS. Further, the lights are reflected on the light reflection plates REF formed on both end surfaces and are introduced into the inside of the main light guide plate GLBM. The lights which are introduced into the inside of the main light guide plate GLBM are reflected on the light reflection surface formed on the back surface of the main light guide plate GLBM and are irradiated from the light irradiation surface formed on the front surface of the main light guide plate GLBM, pass through the optical sheet stacked body OPS and are radiated toward the back surface of the liquid crystal display panel PNL.

Figure 3:
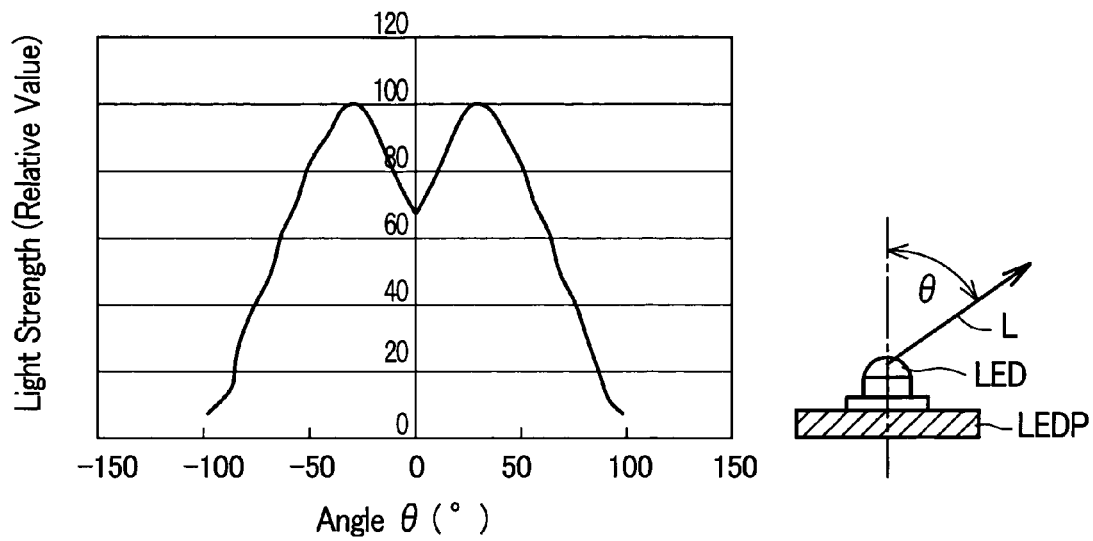
FIG. 3 is a chart showing the relationship between an irradiation angle of an irradiation light from a dome-emitter-type light emitting diode and the intensity of the light.

Here, as the light emitting diodes LED capable of emitting lights of three colors consisting of R (red), G (green), B (blue), it is possible to use light emitting diodes which have various irradiation properties. For example, it is possible to use the light emitting diodes in which the relationship between an irradiation angle θ and the intensity of light of the irradiated light L from the light emitting diode LED adopts the lambertian radiation pattern of a dome-emitter-type light emitting diode LED shown in FIG. 3. The lambertian radiation pattern is a pattern in which the intensity of light assumes a peak value when the irradiation angle θ falls in a range of 20° to 40° and −20° to −40°, the intensity of light right above the solid-state light emitting element LCD is slightly low, and the intensity of light is attenuated to one half or less of the peak value when the irradiation angle θ falls in a range of 60° to 80° or more and −60° to −80° or less.

Figure 4:
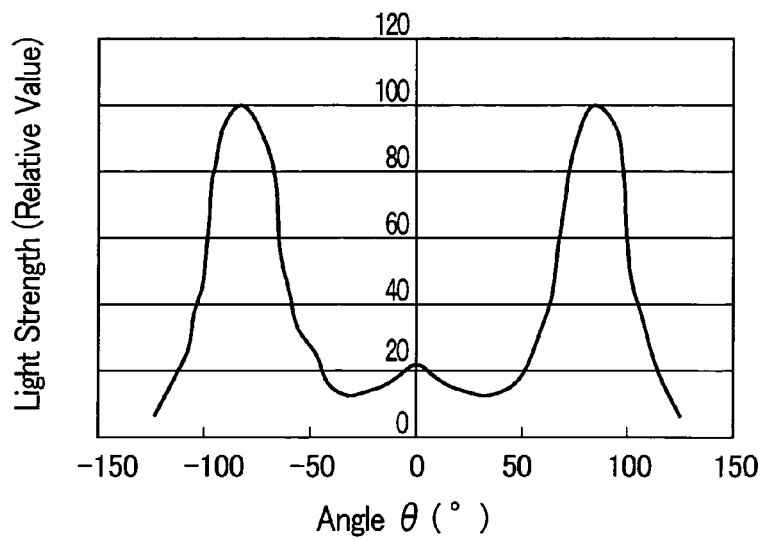
FIG. 4 is a chart showing the relationship between an irradiation angle of an irradiation light from a side-emitter-type light emitting diode and the intensity of the light.

Further, as the light emitting diodes LED capable of emitting lights of three colors consisting of R (red), G (green), B (blue), a side-emitter-type light emitting diode LED may be used besides the dome-emitter-type light emitting diode LED which adopts the lambertian radiation pattern. The radiation pattern of the side-emitter-type light emitting diode LED has the property shown in FIG. 4, wherein the intensity of light assumes a peak value when the irradiation angle θ falls in a range of 60° to 100° or above and −60° to −100° and, thereafter, is sharply attenuated. That is, the radiation pattern of the side-emitter-type light emitting diode LED is a pattern in which the substantially all irradiation lights are irradiated in the strictly lateral direction of the light emitting diode LED. In the constitution of the invention, with the use of the light source formed of the side-emitter-type light emitting diodes LED, it is possible to allow the light to be incident on the inside of the sub light guide body GLBS efficiently and hence, the use of the light source formed of the side-emitter-type light emitting diodes LED is extremely effective. That is, it is possible to realize the direct incidence of the light on the sub light guide plate GLBS with high efficiency.

Figure 5:
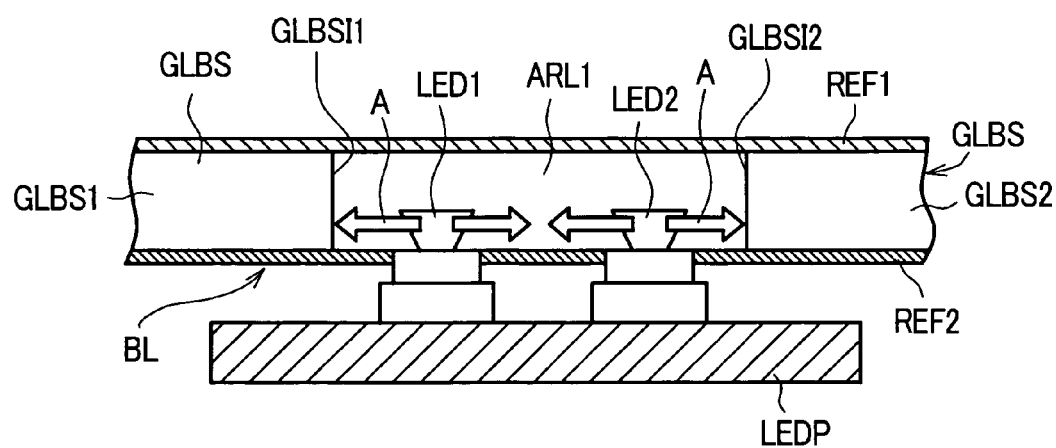
FIG. 5 is an enlarged cross-sectional view of an essential part showing a constitutional example of another embodiment of the backlight device according to the invention.
Figure 6:
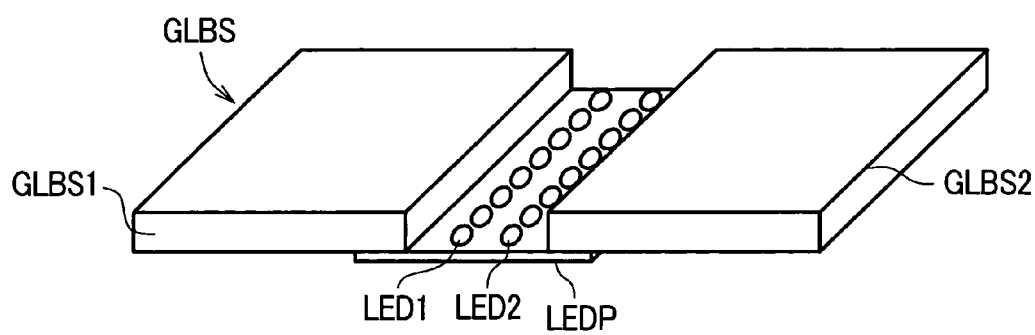
FIG. 6 is a perspective view of an essential part showing the arrangement of light-emitting diodes shown in FIG. 5.

FIG. 5 is a cross-sectional view of an essential part for explaining another constitutional example of the backlight device according to the invention, wherein parts identical to the part explained previously are given same symbols and their explanation is omitted. In FIG. 5, the constitution which makes this constitutional example different from the constitutional example shown in FIG. 2 lies in that in the inside of the first air layer ARL1 which constitutes the light introduction opening formed between the first sub light guide plate GLBS1 and the second sub light guide plate GLBS2, as shown in FIG. 6 which is a perspective view of an essential part, the light emitting diode board LEDP is mounted in a state that the light emitting diodes LED1, LED2 capable of emitting lights of three colors consisting of R (red), G (green), B (blue) are arranged in two rows. In this case, it is necessary to increase a width in the plane direction of the first air layer ARL1. Further, although not shown in the drawing, it is also possible to provide the constitution in which the light emitting diodes LED1, LED2 shown in FIG. 6 are arranged in a staggered pattern thus realizing the further effective utilization of the light.

Figure 7:
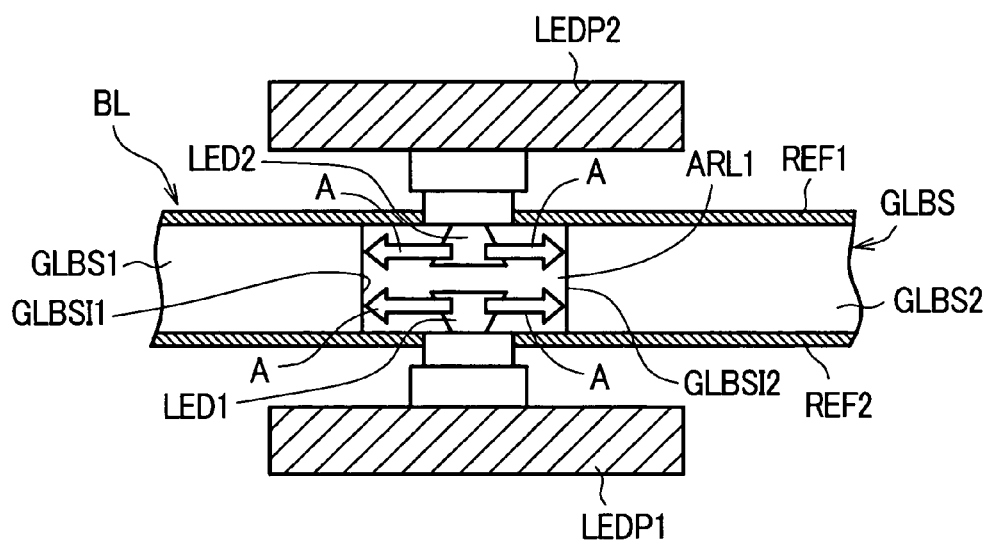
FIG. 7 is an enlarged cross-sectional view of an essential part showing a constitutional example of still another embodiment of the backlight device according to the invention.

FIG. 7 is a cross-sectional view of an essential part for explaining still another constitutional example of the backlight device according to the invention, wherein parts identical to the part explained previously are given same symbols and their explanation is omitted. In FIG. 7, the constitution which makes this constitutional example different from the constitutional example shown in FIG. 2 lies in that in the inside of the first air layer ARL1 which is formed between the first sub light guide plate GLBS1 and the second sub light guide plate GLBS2, the light emitting diode boards LEDP1, LEDP2 which arrange the light emitting diodes LED1, LED2 capable of emitting lights of three colors consisting of R (red), G (green), B (blue) thereon are mounted in a state that light emitting diode boards LEDP1, LEDP2 face each other in the vertical direction (the plate thickness direction).

Figure 8:
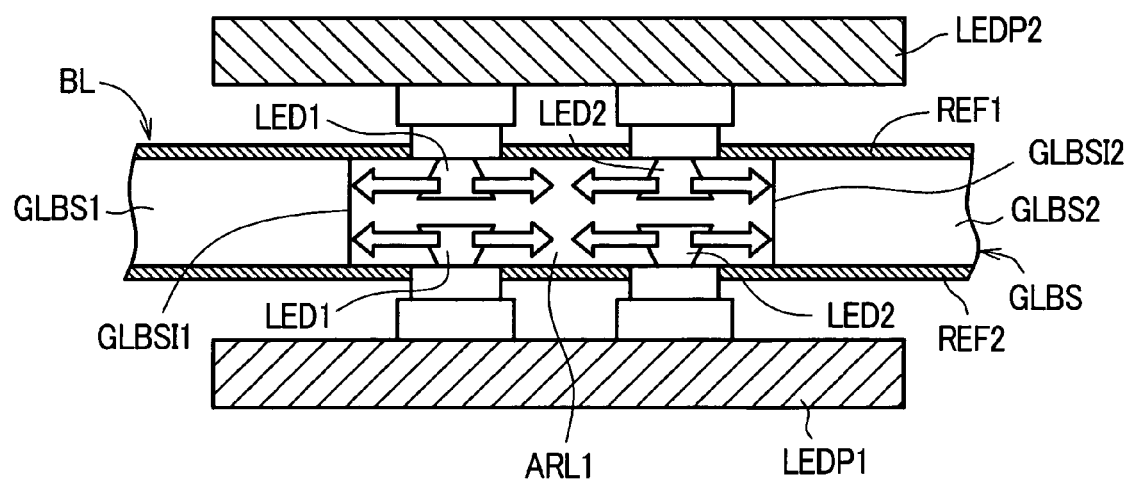
FIG. 8 is an enlarged cross-sectional view of an essential part showing a constitutional example of another embodiment of the backlight device according to the invention.

FIG. 8 is a cross-sectional view of an essential part for explaining still another constitutional example of the backlight device according to the invention, wherein parts identical to the part explained previously are given same symbols and their explanation is omitted. In FIG. 8, the constitution which makes this constitutional example different from the constitutional example shown in FIG. 2 lies in that in the inside of the first air layer ARL1 formed between the first sub light guide plate GLBS1 and the second sub light guide plate GLBS2, two sets of light emitting diode boards LEDP1, LEDP2 each of which arranges the light emitting diodes LED1, LED2 capable of emitting lights of three colors consisting of R (red), G (green), B (blue) thereon in two rows are mounted in a state that light emitting diode boards LEDP1, LEDP2 face each other in the vertical direction (the plate thickness direction).

In such a constitution, by arranging the light emitting diodes LED1, LED2 capable of emitting lights of three colors consisting of R (red), G (green), B (blue) in two rows in the inside of the first air layer ARL1, it is possible to increase a quantity of light which is incident on the inside of the sub light guide plate GLBS (the first sub light guide plate GLBS1 and the second sub light guide plate GLBS2) and hence, the brightness enhancing effect can be obtained and, at the same time, the desired brightness can be obtained by controlling the number and quantity of light of the light emitting diodes LED1 and the light emitting diodes LED2. Further, the lights having the same wavelength are irradiated to the first sub light guide plate GLBS1 and the second sub light guide plate GLBS2 simultaneously and in a large quantity and are incident on both sub light guide plates GLBS1, GLBS2 and are subjected to color mixture in a well-balanced manner whereby it is possible to obtain the light-source light with high brightness uniformity and the high chromaticity uniformity.

Embodiment 2

Figure 9:
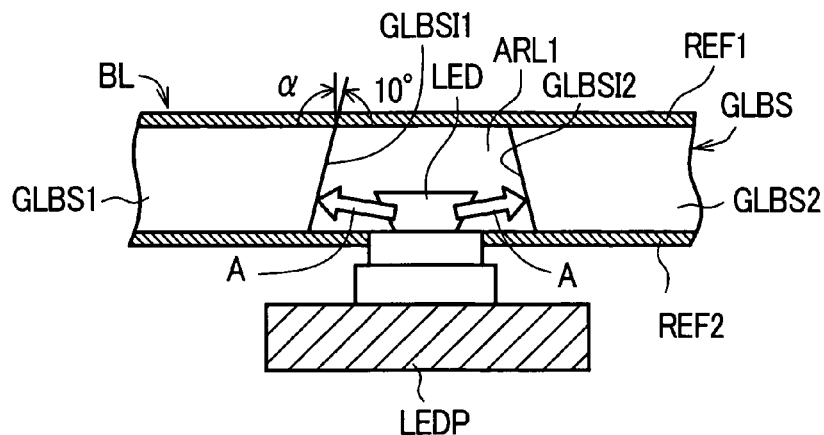
FIG. 9 is an enlarged cross-sectional view of an essential part showing an inclination angle α of a light incident surface of a second sub light guide plate.

The shape of the respective light incident surfaces GLBS11 and light incident surfaces GLBS12 of the sub light guide plate GLBS (the first sub light guide plate GLBS1 and the second sub light guide plate GLBS2) which allows the incidence of the irradiated light from the light emitting diodes LED (the light emitting diodes LED1 and the light emitting diodes LED2) is an important factor which has an influence in determining an optical path length of the light which propagates in the inside of the sub light guide plate GLBS. Assuming that the LED inclination angle θ is approximately 80° and a half value width which halves the luminous intensity is approximately ±20° at a center portion of the light radiation pattern of the light emitting diode LED, to set the incident angle of the light beams at the center portion to 0°, that is, to prevent the light beams from refraction on an air layer-light guide plate boundary face, as shown in FIG. 9 which is an enlarged cross-sectional view of an essential part, an inclination angle α of the light incident surfaces GLBS11 and the light incident surfaces GLBS12 is set to approximately 10°. In this embodiment, "the inclination angle α being set to approximately 10°" implies that the maximum effect can be expected at the approximately 10° and some effect can be also expected also in a range of, for example, 5° to 15°.

Figure 10:
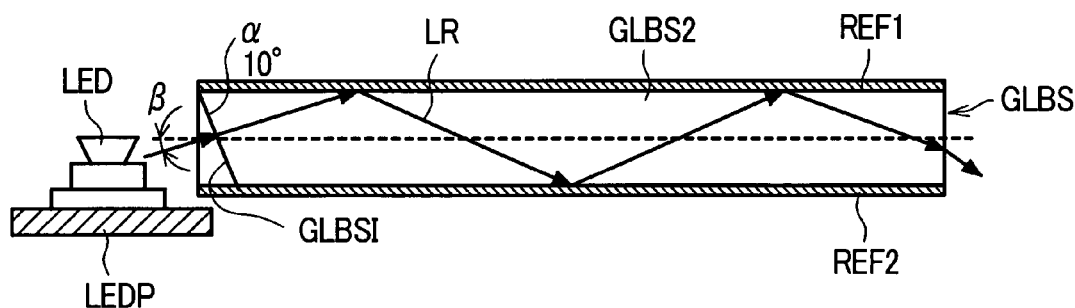
FIG. 10 is a cross-sectional view showing a concept of an optical path length when the inclination angle α of the light incident surface of the second sub light guide plate is set to approximately 10°.
Figure 11:
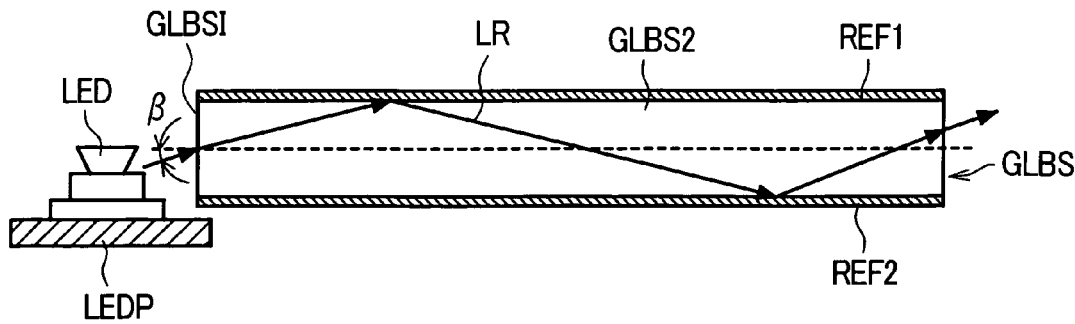
FIG. 11 is a cross-sectional view showing the concept of the optical path length when the inclination angle α of the light incident surface of the second sub light guide plate is set to approximately 0°.

FIG. 10 is a cross-sectional view showing a concept of the optical path length LR when the inclination angle α of the light incident surface GLBS12 of the second sub light guide plate GLBS2 is set to approximately 10°, while FIG. 11 is a cross-sectional view showing a concept of the optical path length LR of the conventional constitution when the light incident surfaces GLBS12 has no inclination angle (the inclination angle α=0°). Here, β indicates an incident angle of the emitted light from the light emitting diodes LED.

As can be clearly understood from FIG. 10, compared to the conventional constitution with no inclination angle α shown in FIG. 11, by setting the inclination angle α of the light incident surface GLBS12 to approximately 10°, it is possible to elongate the optical path length LR as shown in a following Table 1. Due to such a constitution, it is possible to largely enhance the light utilizing efficiency of the irradiated light from the light emitting diode LED. Here, although the explanation has been made with respect to the second sub light guide plate GLBS2 in this embodiment, the exactly same advantageous effects can be obtained with respect to the first sub light guide plate GLBS1.

TABLE 1

|  | LED irradiation angle θ(°) | Incident angle of light guide plate β(°) | Optical path length LR | Total optical path length |
|---|---|---|---|---|
| Incident surface of light guide plate | 60 | −10 | 0.993 | 1.000 |
|  | 80 | 10 | 1.000 | |

TABLE 1-continued

|  | LED irradiation angle θ(°) | Incident angle of light guide plate β(°) | Optical path length LR | Total optical path length |
|---|---|---|---|---|
| with no inclination angle | 100 | 30 | 1.054 | |
| Incident surface of light guide plate with inclination angle of α = 10° | 60 | −20 | 1.020 | 1.003 |
|  | 80 | 0 | 1.009 | |
|  | 100 | 20 | 1.020 | |

Embodiment 3

Currently, the main light guide plate and the sub light guide plates are manufactured using a light transmitting resin material such as an acrylic resin material or a polycarbonate-orientated material and the densities of these light transmitting resin materials are approximately 1.10 g/cm³. In a commercially available 20-inch-class liquid crystal television set which uses a cold cathode fluorescent lamp as a light source, only one main light guide plate is used. However, the weight of the main light guide plate is extremely heavy, that is, approximately 1 Kg or more. In the liquid crystal television of the same class which uses light emitting diodes capable of emitting lights of three colors consisting of R (red), G (green), B (blue) as a light source, the total weight of the main light guide plate and the sub light guide plates becomes approximately 2 Kg.

In view of the above, as a means for reducing the weight of the light guide plate GLBS, this embodiment forms the above-mentioned sub light guide plates GLBS by using a light transmitting liquid such as water, for example, which is more light-weighted than the transmitting resin material such as the acrylic resin material or the polycarbonate resin material and exhibits no large change in refractive index and by filling the liquid in a container made of an acrylic resin material. As an example, to compare the weights of the sub light guide plate having a size of 100 mm×500 mm×10 mm depending on the difference of the materials, the sub light guide plate manufactured by this embodiment can be made light-weighted by approximately 12%. That is, the liquid crystal television set can be made light-weighted by approximately 150 g for each set.

Figure 12:
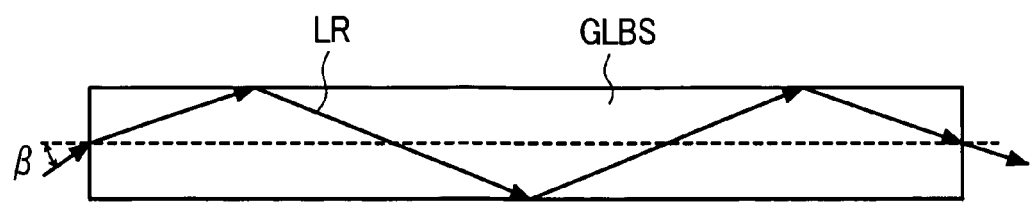
FIG. 12 is a cross-sectional view showing the concept of the optical path length when the Snell laws of refraction are taken into consideration with respect to a sub light guide plate GLBS (acrylic light guide plate)
Figure 13:
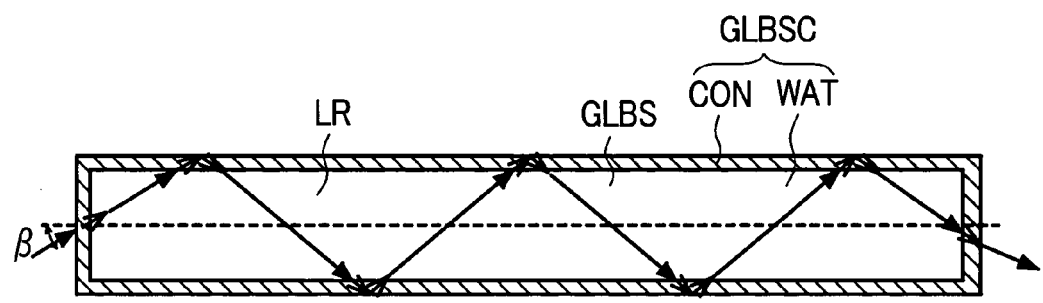
FIG. 13 is a cross-sectional view showing the concept of the optical path length when the Snell laws of refraction is taken into consideration with respect to a sub light guide plate which is formed by filling water in the inside of a light transmitting acrylic-resin-made container.

FIG. 12 is a cross-sectional view showing a concept of an optical path length which takes the Snell laws of refraction into consideration with respect to a current sub light guide plate GLBS (acrylic light guide plate) which is made of an acrylic resin material, while FIG. 13 is a cross-sectional view showing a concept of an optical path length which takes the Snell laws of refraction into consideration with respect to the sub light guide plate GLBSC (the water light guide plate) which is formed by filling water WAT, for example, as a light transmitting liquid into the inside of a container CON made of a light transmitting acrylic resin material or the like. Here, the refractive index of the light transmitting acrylic resin material is approximately 1.49 and the refractive index of water is approximately 1.33. Further, assuming an incident angle of the emitted light irradiated from the light emitting diode as β, the relationship between the light guide plate length and the optical path length is obtained by the calculation and a result of the calculation is shown in a following table.

TABLE 2

| Incident angle β (°) | Optical path length ratio (water light guide plate/acrylic light guide plate) |
|---|---|
| 10 | 1.11 |
| 30 | 1.13 |
| 50 | 1.13 |

As can be clearly understood from Table 2, with respect to the light guide plate GBSC (the water light guide plate) which uses water WAT as the light guide plate material shown in FIG. 13, although the refractive index of water WAT is slightly smaller than the refractive index of the acrylic resin material, with the use of the acrylic resin container CON, it is possible to elongate the optical path length LR than the optical path length of the currently available sub light guide plate GLBS (acrylic light guide plate) shown in FIG. 12. Due to such an advantageous effect, the color mixture of the light emitting diodes capable of emitting lights of three colors consisting of R (red), G (green), B (blue) which constitutes the light source is enhanced and hence, the color uniformity in the inside of the light illuminated surface can be enhanced. Further, when the sufficient color uniformity is ensured in the sub light guide plate GLBS (acrylic light guide plate), this implies that it is possible to set the optical path length LR of the light guide plate GLBSC (the water light guide plate) equal to the optical path length LR of the sub light guide plate GLBS (the acrylic light guide plate) and hence, the light guide plate length can be shortened whereby the backlight device can be made further light-weighted.

Embodiment 4

Figure 14:
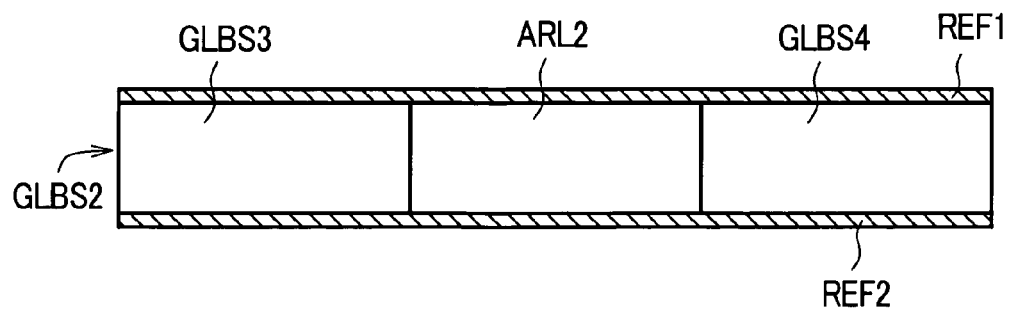
FIG. 14 is an enlarged cross-sectional view of the sub light guide plate showing the constitution according to another embodiment of the backlight device of the invention.

FIG. 14 is an enlarged cross-sectional view of an essential part of the sub light guide plate for explaining the constitution of an embodiment 4 of the backlight device according to the invention, wherein parts identical to the part explained previously are given same symbols and their explanation is omitted. In FIG. 14, the sub light guide plate GLBS (the first sub light guide plate GLBS1 and the second sub light guide plate GLBS2) is configured such that the sub light guide plate GLBS is divided in two, that is, into a third sub light guide plate GLBS3 and a fourth sub light guide plate GLBS4 and a second air layer ARL2 where only air is present is provided in an intermediate portion. Here, in this embodiment, although the explanation is made with respect to the case in which the second sub light guide plate GLBS2 is divided in two, the above-mentioned first sub light guide plate GLBS1 is also formed in a two-split manner with the same constitution although not shown in the drawing.

According to such a constitution, by dividing the sub light guide plate GLBS in two such that a volume of the sub light guide plate GLBS is substantially equal to a volume of the second air layer ARL2, it is possible to reduce the weight of the sub light guide plate GLBS to approximately ⅔ of the weight of the sub light guide plate GLBS with no air layer ARL2.

Figure 15:
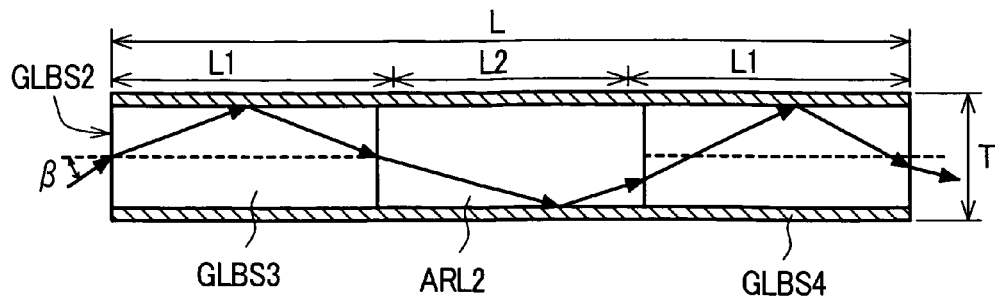
FIG. 15 is a cross-sectional view showing a concept of an optical path length shown in FIG. 14.

FIG. 15 is a cross-sectional view showing a concept of the optical path length when the sub light guide plate GLBS is divided in two with the condition that a length L is set to L=100 mm, a plate thickness T is set to T=6 mm, and lengths of the third sub light guide plate GLBS3 and the fourth sub light guide plate GLBS44 are set to L1=35 mm with respect to the sub light guide plate GLBS explained in FIG. 14 and a length of the second air layer ARL2 is set to L2=30 mm.

In this embodiment, it is possible to reduce the weight of the sub light guide plate GLBS to approximately 70% of the weight of the continuous sub light guide plate GLBS with no second air layer ARL2. Further, to calculate the optical path length with respect to the incident angle β of the emitted light from the light emitting diode, as shown in a following Table 3, along with the increase of the incident angle β, it is possible to increase the optical path lengths of the third sub light guide plate GLBS3 and the fourth sub light guide plate GLBS4 which are formed by division.

TABLE 3

| Incident angle β (°) | Optical path length ratio (divided light guide plate/continuous light guide plate) |
|---|---|
| 0 | 1.000 |
| 10 | 1.003 |
| 20 | 1.011 |
| 30 | 1.026 |
| 40 | 1.053 |
| 50 | 1.100 |
| 60 | 1.188 |
| 70 | 1.381 |

Embodiment 5

Figure 16:
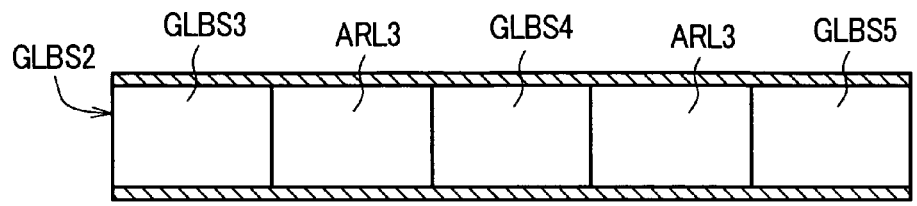
FIG. 16 is an enlarged cross-sectional view of the sub light guide plate showing the constitution of still another embodiment of the backlight device according to the invention.

FIG. 16 is an enlarged cross-sectional view of an essential part of the sub light guide plate for explaining the constitution of an embodiment 5 of the backlight device according to the invention, wherein parts identical to the parts explained previously are given same symbols and their explanation is omitted. In FIG. 16, the sub light guide plate GLBS2 is configured such that the sub light guide plate GLBS2 is divided in three, that is, into a third sub light guide plate GLBS3, a fourth sub light guide plate GLBS4 and a fifth sub light guide plate GLBS5 and a third air layer ARL3 and a fourth air layer ARL4 are provided in intermediate portions. Also in this embodiment, the explanation is made with respect to the case in which the second sub light guide plate GLBS2 is divided in three, the above-mentioned first sub light guide plate GLBS1 is, although not shown in the drawing, also formed in a three-split manner with the same constitution.

According to such a constitution, by dividing the sub light guide plate GLBS in three such that a volume of the sub light guide plate GLBS is substantially equal to a volume of the third air layer ARL3 and the fourth air layer ARL4, it is possible to reduce the weight of the sub light guide plate GLBS to approximately ⅗ of the weight of the sub light guide plate GLBS with neither of the air layers ARL3, ARL4. In this case, by dividing the sublight guide plate GLBS in three, it is possible to achieve the further reduction of the weight and, at the same time, it is possible to achieve the further elongation of the optical path length.

Figure 17:
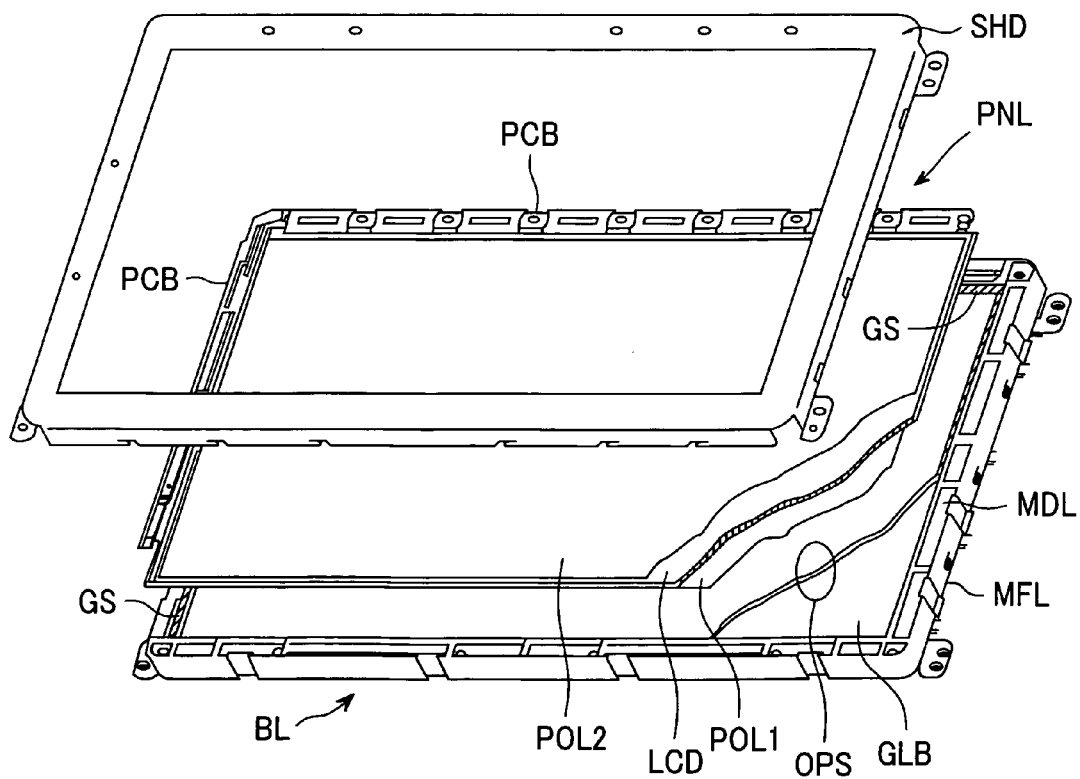
FIG. 17 is a developed perspective view of an essential part for explaining one example of the whole constitution of a display device according to the invention.

FIG. 17 is a developed perspective view for explaining an overall constitutional example of the display device according to the invention. In FIG. 17, the liquid crystal display panel PNL mounts drive circuits on a periphery (an upper side and a lower side in this embodiment) of a liquid crystal display cell and includes a printed circuit board PCB which supplies signals to these drive circuits. Further, polarizers POL1, POL2 are stacked on front and back surfaces of the liquid crystal display cell respectively.

The backlight device BL which is mounted on a back surface of the liquid crystal display panel PNL includes a mold frame MDL which accommodates the light guide plates GLB (the main light guide plate and the sub light guide plates), the light emitting diode board which mounts the light emitting diodes thereon, the light reflection plates and the like. Here, the backlight device BL is supported on the mold frame MDL. Further, above the light guide plates GLB, the optical sheet OPS consisting of two sets of prism sheet and diffusion sheets is mounted.

In this constitutional example, the backlight device BL in each embodiment described heretofore is mounted using shape elastic members GS which are arranged on an inner peripheral portion of the mold MDL. The liquid crystal display panel PNL is mounted on the backlight device BL by way of these shape elastic members GS, the liquid crystal display panel PNL is covered with an upper frame SHD from above, and the upper frame SHD is integrally formed with a lower frame MFL by connection.

In the display device having such a constitution, the liquid crystal display panel PNL is illuminated with the light irradiated from the backlight device BL which is constituted of the light guide plate GLB (the main light guide plate and the sub light guide plates), the light emitting diode board which mounts the light emitting diodes thereon, the light reflection plates and the like whereby electronic latent images which are formed on the liquid crystal display panel PNL are visualized.

Figure 18:
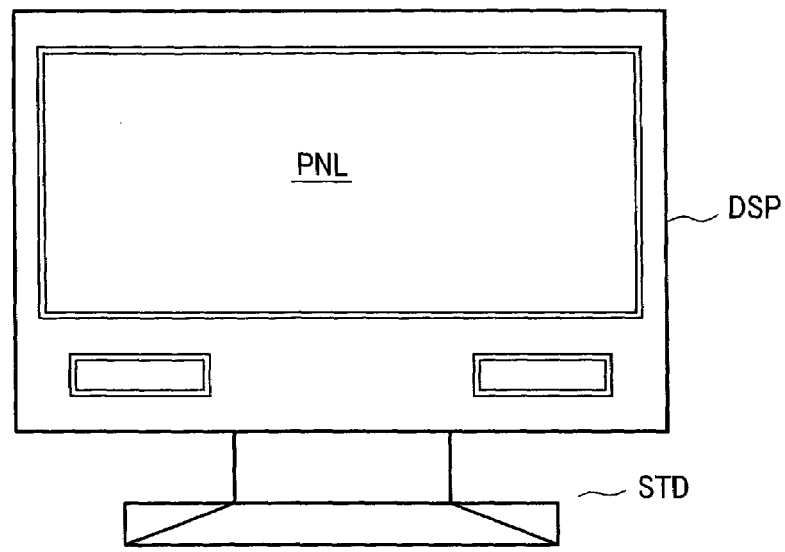
FIG. 18 is an appearance view of a television receiver set which constitutes an example of an electronic equipment which mounts a liquid crystal display module using a liquid crystal display device as a display device according to the invention thereon.
Figure 19:
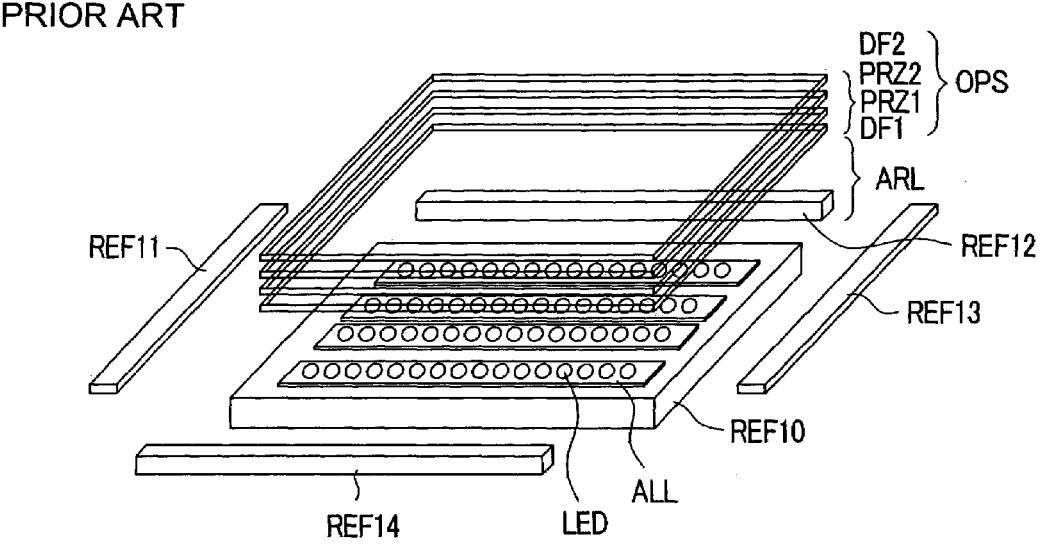
FIG. 19 is a developed perspective view of an essential part showing the constitution of a backlight device which uses a solid-state light emitting element capable of emitting lights of three colors as a light source.

FIG. 18 is an appearance view of a television receiver set which constitutes one example of an electronic equipment which mounts the liquid crystal display module as the display device of the invention. In FIG. 18, the television receiver set is constituted of a display part DSP and a stand part STD and the liquid crystal display device which includes the liquid crystal display panel PNL having a relatively large-sized screen is mounted on the display part DSP. An effective display region of the liquid crystal display panel PNL which constitutes a screen of the liquid crystal display device is exposed on the display part DSP. By mounting the liquid crystal display device according to the invention on the display part DSP of the television receiver set, it is possible to realize the image display device of high quality and high reliability which exhibits the high color reproducibility.

In the above-mentioned embodiments, the explanation has been made with respect to the case in which the invention is applied to the large-sized liquid crystal television receiver set on which the liquid crystal display module using the liquid crystal display device having the solid-state light-emitting-element backlight device is mounted. However, it is possible to obtain the substantially same advantageous effects by applying the invention to other display device such as a large-sized liquid crystal monitor, a vehicle-mounted liquid crystal display (a liquid crystal car navigation set), a mobile phone display, a liquid crystal display for a game, a liquid crystal monitor for medical use, a liquid crystal monitor for printing/ designing or the like.

The invention claimed is:

1. A liquid crystal display device which includes a liquid crystal display panel which is constituted by sandwiching a liquid crystal layer between a pair of transparent substrates having electrodes for forming pixels on inner surfaces thereof and a backlight device which is mounted on a back surface of the liquid crystal display panel, the backlight device comprising:
    a main light guide body which has a light irradiation surface which irradiates light forwardly by developing the light in plane;
    a sub light guide body which is arranged on a back surface of the main light guide body, is divided into a first sub light guide body and a second sub light guide body on both end sides by way of a first air layer disposed in the vicinity of a center portion, and forms light incident surfaces on facing end surfaces of the first sub light guide body and the second sub light guide body in the inside of the first air layer;
    reflectors which are arranged on both end surfaces of the main light guide body and the sub light guide body and optically couple the main light guide body and the sub light guide body; and
    a solid-state light emitting element board which is mounted in a state that solid-state light emitting elements capable of emitting light of respective colors consisting of R, G, B in the inside of the first air layer of the sub light guide body are arranged at least in a row.

2. A liquid crystal display device according to claim 1, wherein the solid-state light emitting element is a side-emitter-type solid-state light emitting element.

3. A liquid crystal display device according to claim 1, wherein the main light guide body has a light reflection surface which faces the light irradiation surface in an opposed manner and reflects the light toward the light irradiation surface, and the sub light guide body includes a first light reflection surface on a surface thereof which faces the main light guide body and a second light reflection surface on a back surface which faces the first light reflection surface in an opposed manner.

4. A liquid crystal display device according to claim 1, wherein the solid-state light emitting element board is mounted on front and back surfaces of the first air layer by arranging the solid-state light emitting elements capable of emitting light of plurality of colors in the inside of the first air layer in a state that the solid-state light emitting elements face each other.

5. A liquid crystal display device according to claim 1, wherein the first sub light guide body and the second sub light guide body are constituted by filling a light transmitting liquid in the inside of a light transmitting container.

6. A liquid crystal display device according to claim 1, wherein the inside of the first sub light guide body and the second sub light guide body is divided into a plurality of sub light guide bodies by interposing a second air layer consisting of at least one layer.

7. A liquid crystal display device according to claim 1, wherein light incident surfaces of the first sub light guide body and the second sub light guide body are provided with an incident angle which allows the light irradiated from the solid-state light emitting element capable of emitting light of a plurality of colors to be incident on the light incident surfaces.

8. A display device comprising:
    a display panel which performs an image display; and
    a backlight device which is arranged on a back surface of said display panel, wherein
    said backlight device includes
    a main light guide body which includes a light irradiation surface for irradiating light toward said display panel side;
    a sub light guide body which is arranged on a back surface of said main light guide body, has the vicinity of a center thereof divided by a first air layer, and has both end portions thereof respectively optically coupled to said main light guide body; and
    a plurality of solid-state light emitting elements which are arranged in the inside of said first air layer of said sub light guide body.

9. A display device according to claim 8, wherein said solid-state light emitting element is a side-emitter-type solid-state light emitting element.

10. A display device according to claim 8, wherein said main light guide body and said sub light guide body are optically coupled to each other using a reflector.

11. A display device according to claim 8, wherein said sub light guide body is configured to be divided into a plurality of sub light guide bodies due to a second air layer different from said center portion.

12. A display device according to claim 8, wherein a light incident surface of said sub light guide body with respect to said solid-state light emitting elements is configured to be inclined by approximately 10° with respect to the vertical direction.

13. A display device according to claim 8, wherein said plurality of solid-state light emitting elements are configured to be arranged at least in a row.

14. A display device according to claim 8, wherein said plurality of solid-state light emitting elements are configured to be arranged above and below the first air layer and to face each other.

15. A display device according to claim 8, wherein said main light guide body is configured to include a light reflection surface on a surface opposite to said light irradiation surface.

16. A display device according to claim 8, wherein said sub light guide body is configured to have a reflection surface on upper and lower surfaces of said sub light guide body.

17. A backlight device comprising:
   a main light guide body which has a light irradiation surface which irradiates light forwardly by developing the light in plane and has a light reflection surface which faces said light irradiation surface in an opposed manner and reflects the light toward said light irradiation surface;
   a sub light guide body which is arranged on a back surface of said main light guide body, is divided into a first sub light guide body and a second sub light guide body on both end sides by way of a first air layer disposed at a center portion, and forms light incident surfaces on facing end surfaces of said first sub light guide body and said second sub light guide body in the inside of said first air layer;
   a first light reflection body which is arranged on a front surface of said sub light guide plate which faces said main light guide body;
   a second light reflection plate which is arranged on a back surface of said sub light guide body which faces said first light reflection plate in an opposed manner;
   reflectors which are arranged on both end surfaces of said main light guide body and said sub light guide body and optically couple said main light guide body and said sub light guide body; and
   a solid-state light emitting element board which is mounted in a state that said solid-state light emitting element board faces a back surface of the sub light guide body and solid-state light emitting elements capable of emitting light of plurality of colors in the inside of said first air layer are arranged at least in a row.

18. A backlight device according to claim 17, wherein said solid-state light emitting element is constituted of a side-emitter-type solid-state light emitting element.

19. A backlight device according to claim 17, wherein said solid-state light emitting element board is mounted on front and back surfaces of said first air layer by arranging said solid-state light emitting elements capable of emitting the light of plurality of colors in an opposed manner in said first air layer.

20. A backlight device according to claim 17, wherein said first sub light guide body and said second sub light guide body are formed by filling a light transmitting liquid in the inside of a light transmitting container.

* * * * *